United States Patent [19]
Caudill

[11] Patent Number: 5,673,482
[45] Date of Patent: Oct. 7, 1997

[54] METHOD OF BANDING VEHICLE HUB

[76] Inventor: Wesley Caudill, RD #1 Sprucevale Rd., East Liverpool, Ohio 43920

[21] Appl. No.: 629,024

[22] Filed: Apr. 8, 1996

[51] Int. Cl.$^6$ .................. B21K 1/40; B23P 6/00
[52] U.S. Cl. .................. 29/894.361; 29/894.362; 29/402.11; 29/402.12; 301/8
[58] Field of Search ............. 29/894.342, 894.362, 29/402.11, 402.12, 894.361, 894.36; 301/64.1, 65, 66, 8

[56] References Cited

U.S. PATENT DOCUMENTS

| | | |
|---|---|---|
| 4,315,360 | 2/1982 | Carmichael et al. |
| 4,425,004 | 1/1984 | Carmichael et al. ............ 301/8 |

*Primary Examiner*—P. W. Echols
*Attorney, Agent, or Firm*—Harpman & Harpman

[57] ABSTRACT

This invention is directed to the repair of cast composite vehicle wheel hubs used specifically on trucks. Such hubs typically have a plurality of spokes extending from a boss with webs extending between the spokes. The hubs are cast of composite metal alloy material which cannot be repaired by conventional welding methods due to the metallurgical make-up of the hubs. Damaged outer spoke portions are repaired by fitting an annular band of material by removing a portion of each of the outer spoke surfaces. The band is secured to the spokes by using an intermediate bracket of weldable material secured by mechanical fasteners to the spokes of the hub.

7 Claims, 2 Drawing Sheets

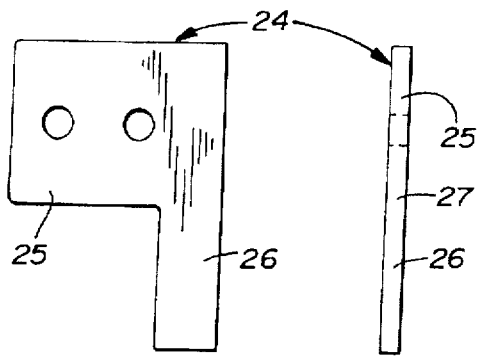
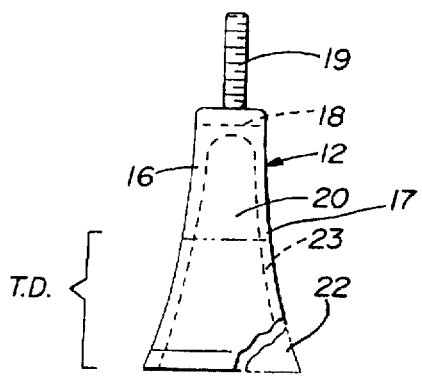
FIG. 3    FIG. 4    FIG. 5
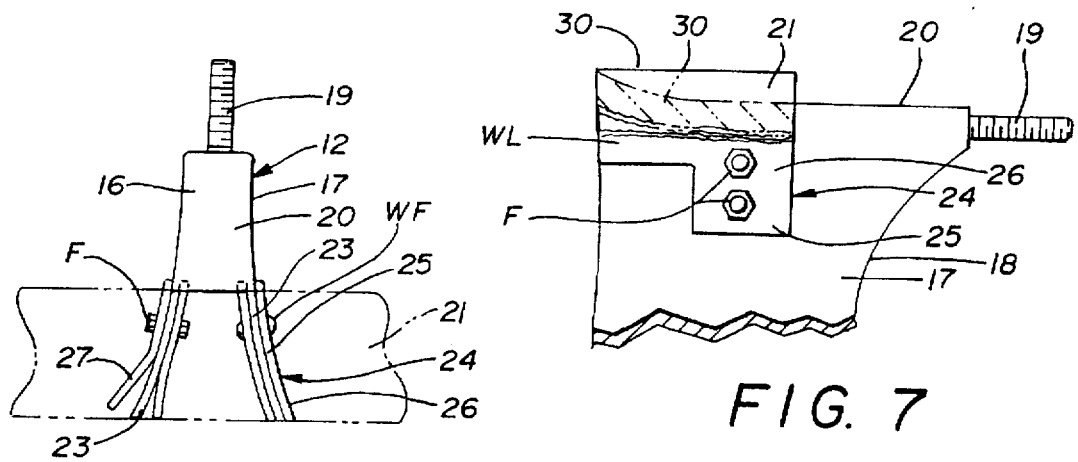
FIG. 6    FIG. 7
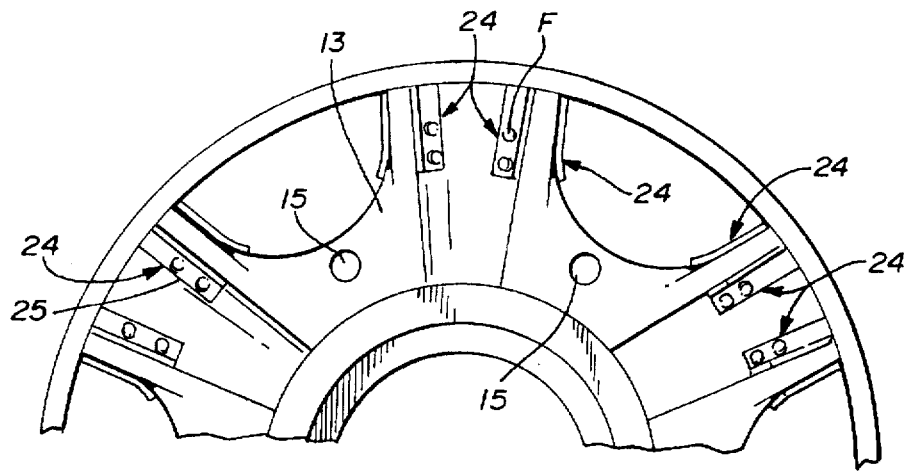
FIG. 8

METHOD OF BANDING VEHICLE HUB

BACKGROUND OF THE INVENTION

1. Technical Field

This invention relates to methods of repairing a truck hub by using a repair insert band thereabout.

2. Description of Prior Art

Prior art repair methods have been directed to repairing damaged truck hubs cast of weldable material. Truck hubs are typically configured to have a central boss with a plurality of spokes radiating outwardly therefrom. The spokes carry studs for securing a tire rim. During extended use a typical fracture occurs as a cracking of the outer face of the spokes where they engage the tire rim. Prior art repair methods have been directed to truck hubs heretofore cast of weldable material, see for example U.S. Pat. Nos. 4,315,360 and 4,425,004.

In U.S. Pat. No. 4,315,360 a truck hub and method of banding same is disclosed wherein a hub cast from weldable material is repaired by cutting away a portion of the damaged spoke face and the remaining spoke faces to insert a continuous annular band thereabout covering the damaged area and interconnecting the spoke ends to one another by welding the repair band in place. The band is then machined to ensure proper dimensional requirements on the outer surface to match the tire rim which is secured by conventional means.

U.S. Pat. No. 4,425,004 is a CIP of U.S. Pat. No. 4,315,360 noted above and is directed to a method of repairing or strengthening a truck hub by attaching an annular band thereabout wherein the band is pre-formed to match the tire rim so as to reduce machining requirements evident in the corresponding parent application.

SUMMARY OF THE INVENTION

This invention is directed to overcome the problems of repairing truck hubs cast from metallurgic alloy components that resist welding thereto. Since the advent of prior art repair techniques in which replacement material in the form of an annular band was welded directly to the cast hub of weldable material, sales of new hubs declined for the manufacturee. This invention is directed to the problem of repairing cast metal alloy hubs by mechanically fastening intermediate weldable material support brackets to the hub so as to form oppositely disposed support and attachment edges adjacent the removed portion of the existing spokes about the hubs. The method of the invention is characterized by removing an outer portion of each spoke that corresponds to the damaged area and adjacent spokes, securing multiple detachable brackets to the spokes by mechanical means and securing by welding an annular band of wrought material to the brackets within the removed spoke area.

DESCRIPTION OF THE DRAWINGS

FIG. 3 is a top plan view of a support plate;

FIG. 4 is a side elevational view of the support plate shown in FIG. 3;

FIG. 5 is an end view of a portion of a spoke in need of repair;

FIG. 6 is an end view of a portion of the spoke during the repair process;

FIG. 7 is an enlarged elevational view of a spoke having the repair band positioned therein before machining; and FIG. 8 is a partial bottom plan view of a repaired hub.

DESCRIPTION OF THE PREFERRED EMBODIMENT

Figure 1:
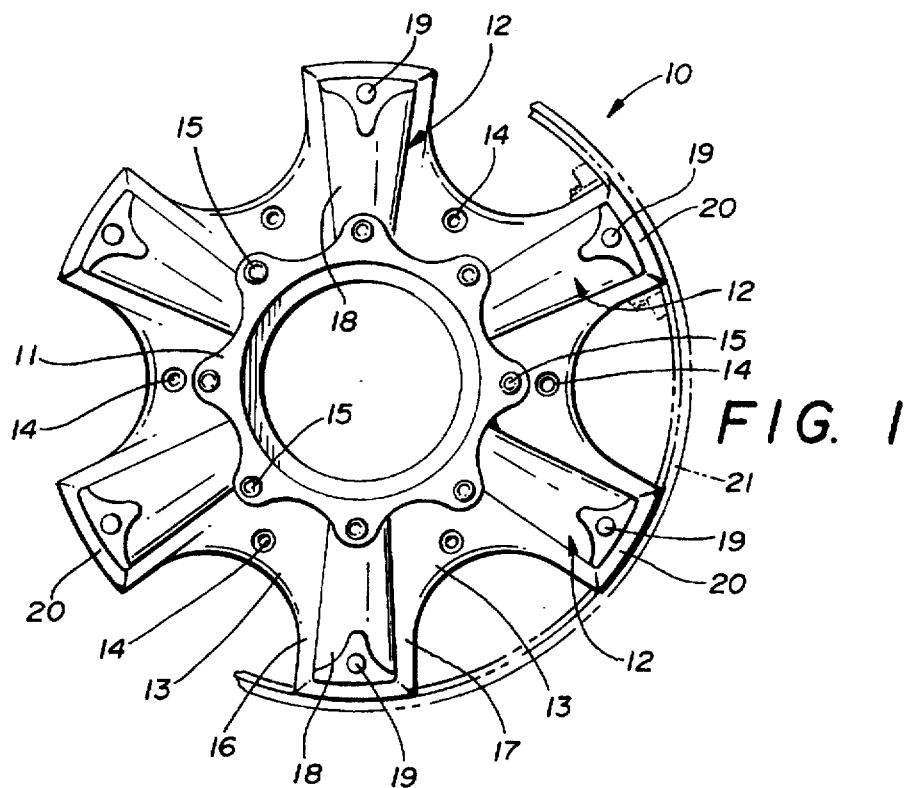
FIG. 1 is a top plan view of a vehicle hub.
Figure 2:
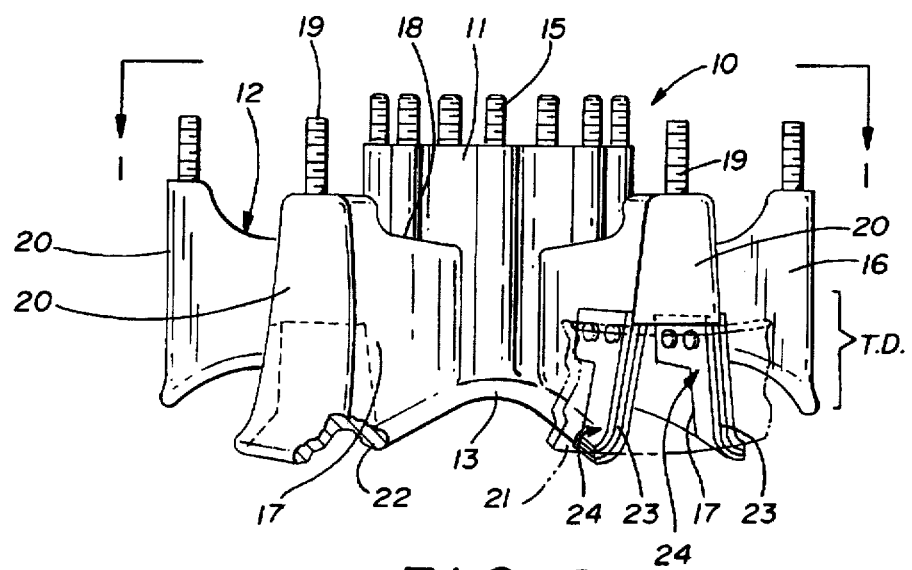
FIG. 2 is a side elevational view of a vehicle hub showing portions of the spokes removed for repair.

Referring to FIGS. 1 and 2 drawings, a truck hub 10 can be seen having a main boss portion 11 with a plurality of support spokes 12 extending radially outwardly therefrom. Webs 13 are formed between the spokes 12 each having an opening 14 therein to accept bolts for securing same to a brake drum, (not shown). A plurality of threaded studs 15 extend outwardly from the boss portion 11 as is well known and understood by those skilled in the art.

Each of the spokes 12 has oppositely disposed sidewalls 16 and 17 and a integral interconnecting upper portion 18 forming together an inverted U-shape cross-sectional configuration.

A plurality of studs 19 extend outwardly from the outer upper ends of the spokes 12 for securing a tire rim, (not shown) to the hub 10 which are adapted to carry tires which is well known within the art.

It will be seen that outer spoke surfaces 20 are defined by the respective ends of the interconnected sidewalls 16 and 17 and upper portions 18 are contoured to fit the tire rim (not shown).

Such truck hubs are now typically cast from a metal alloy that is difficult to weld to and thus the method of the invention is directed towards allowing the repairing and rebuilding of such hereinbefore described hubs which will effectively reinforce and extend their expected service life by insertion of a repair band 21 onto the respective spokes 12 by use of the following method of the invention.

Referring to FIGS. 2, 5 and 6 of the drawings a portions of the outer surfaces 20 of the spokes 12 that are damaged by a crack or missing piece is removed as illustrated in FIG. 5 at 22 so as to be equal to the transverse dimension (TD) of the repair band 21 to be inserted on all of the respective spokes 12 regardless of their condition as illustrated in FIG. 6 of the drawings. The remaining material of the spoke adjacent the removed area defines support shoulder surfaces 23 formed within the respective spoke sidewalls 15 and 16. The shoulder support surfaces 23 are centered on a central axis C of the central boss 12.

Insert support plates 24 as seen in FIG. 3, 4, and 6 of the drawings have a generally flat rectangular configuration with an apertured engagement portion 25 and a band engagement portion 26 defining an engagement edge 27 extending therefrom. The support plates 24 are of a weldable metal composition and are secured to both sides of the respective sidewalls 16 and 17 by mechanical fasteners F extending through aligned apertures within the spokes 12. The engagement edges 27 on the support plates 24 are in alignment with respective support shoulder surfaces 23 as best seen in FIG. 7 of the drawings. The band engagement portion 26 of the support plates 24 extends outwardly therefrom so that upon initial positioning it can be selectively contoured by bending to match the outer surface of the damaged spoke. The apertured engagement portion 25 extends beyond the removed portion at 22, best seen in FIG. 7, thus increasing the strength of the hub.

The repair band 21 is formed from bar stock formed into a ring shape with the adjacent abutting ends thereof welded together. The repair band 21 thus formed is positioned about the hub 10 within the removed outer surface area of the spokes 12 engaging the respective support shoulders 23 and engagement edges 27 of the multiple support plates 24 and secured to the support plates by welding along the corresponding abutting surface lines.

The repair band 21 once welded onto the outer surface 20 of the spokes 12 increases the bearing area thereof and additionally increases the rigidity of the hub overall.

Referring to FIGS. 6 and 7 of the drawings, the repair band 21 after being secured to the spokes 12 and before machining has a generally cylindrical upstanding outer face 30 illustrated in solid lines in FIG. 7 and then in broken lines after machining to match the spokes pre-existing pre-damaged outer surface 20 contour. The machining is accomplished after welding, by positioning the hub on a lathe relative to the axis C with the outer face 30 of the band 21 being machined to match the desired profile shown in broken lines in FIG. 7 of the drawings.

Referring to FIG. 6 of the drawings, an alternate attachment fasteners WF can be seen wherein weldable plugs are inserted through the aperture support plates 24 and intervening respective sidewalls 16, 17, and welded in place.

It will be apparent from the above description that by utilizing deformable support plates 24 set forth in the method of the invention that truck hubs 10 cast of metal alloys which are difficult to weld to can be repaired an reinforced with the replacement band 21 of weldable metal composition which was heretofore not possible.

It will be apparent to those skilled in the art that various changes and modifications may be made therein without departing from the spirit of the invention, therefore I claim:

1. A method of repairing a vehicle hub of metal alloy material, said vehicle hub having a central boss with a central axis, a plurality of spokes radiating outwardly from said boss, webs extending between the spokes, studs extending from each of said spokes adjacent its respective free ends in parallel axial alignment with said center axis, said method of repairing a vehicle hub comprises the steps of a. removing a portion of the outer surface of each of said spokes b. securing at least one support plate to each of said spokes c. securing a repair band to said support plates by welding d. removing a portion of said repair band extending above the original outer surface face of said spokes.

2. The method set forth in claim 1 wherein mechanical fasteners are used to secure said support plates to said spokes.

3. The method set forth in claim 1 wherein remaining portions of the spokes surfaces form a pair of repair band support shoulders.

4. The method set forth in claim 3 wherein said repair band engages said support shoulders and said support plate portions in overlying relation to one another.

5. The method set forth in claim 1 wherein said repair band is formed from bar stock into a ring, the ends of which are welded together.

6. The method set forth in claim 1 wherein securing said repair band to said support plates on each of said spokes by welding comprises;

a. a fillt weld between abutting edges of said support plates and said repair band.

7. The method set forth in claim 1 wherein removing a portion of said repair band extending above the outer surface of said spoke comprises machining said repair band by mounting said hub on a lathe.

\* \* \* \* \*